United States Patent
Fontijn et al.

(10) Patent No.: US 7,154,834 B2
(45) Date of Patent: Dec. 26, 2006

(54) RECORDING INFORMATION FOR SEAMLESS PLAYBACK

(75) Inventors: Wilhelmus Franciscus Johannes Fontijn, Eindhoven (NL); Johannes Arnoldus Cornelis Bernsen, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 10/527,855

(22) PCT Filed: Aug. 8, 2003

(86) PCT No.: PCT/IB03/03556

§ 371 (c)(1),
(2), (4) Date: Mar. 16, 2005

(87) PCT Pub. No.: WO2004/027774

PCT Pub. Date: Apr. 1, 2004

(65) Prior Publication Data

US 2006/0013088 A1    Jan. 19, 2006

(30) Foreign Application Priority Data

Sep. 20, 2002 (EP) ............... 02078902

(51) Int. Cl.
*G11B 5/09* (2006.01)
(52) U.S. Cl. ................. 369/59.25; 369/30.23; 369/47.32

(58) Field of Classification Search .......... 369/30.23, 369/59.25, 47.32
See application file for complete search history.

(56) References Cited

U.S. PATENT DOCUMENTS

| 6,219,311 B1 | 4/2001 | Mitsuno |
| 6,392,968 B1 * | 5/2002 | Kageyama et al. ...... 369/47.13 |

FOREIGN PATENT DOCUMENTS

| EP | 0903744 A2 | 3/1999 |
| EP | 1150293 A1 | 10/2001 |

* cited by examiner

*Primary Examiner*—Wayne Young
*Assistant Examiner*—Minerva Rivero

(57) ABSTRACT

A disc recording device has a rule based extent allocation strategy. Real-time information like audio is to be reproduced continuously via a rendering system having predefined properties: a buffer, a minimal read-out speed Rdisc, and a maximal seek time Tseek. The information is arranged in files that have a maximal data rate Rfile, and a maximal size of header information Sheaders that precedes and/or follows the real-time information in the file. The information of the files is recorded in contiguous parts of the track at least having the size of Sextent. The device has an allocation unit (35) for determining a minimal size of an extent Sextent that is a continuous recording unit at least taking into account the properties Rdisc, Tseek, Rfile and Sheaders, in particular according to $Sextent=((Tseek+Sheaders/Rdisc)*Rfile*Rdisc)/(Rdisc-Rfile)$.

13 Claims, 2 Drawing Sheets

| Syntax | # bits |
|---|---|
| CD2_main_audio_info() { | |
| audio_duration | 32 |
| entry_time | 32 |
| audio_type | 8 |
| audio_bit_rate() | 24 |
| sampling_frequency | 5 |
| channel_configuration | 3 |
| bits_per_sample | 2 |
| emphasis_on | 1 |
| multiplexed_lyrics_present | 1 |
| seamless_play_back | 1 |
| reserved_0 | 3 |
| n_slideshow_images | 16 |
| reserved_0 | 16*8 |
| } | |

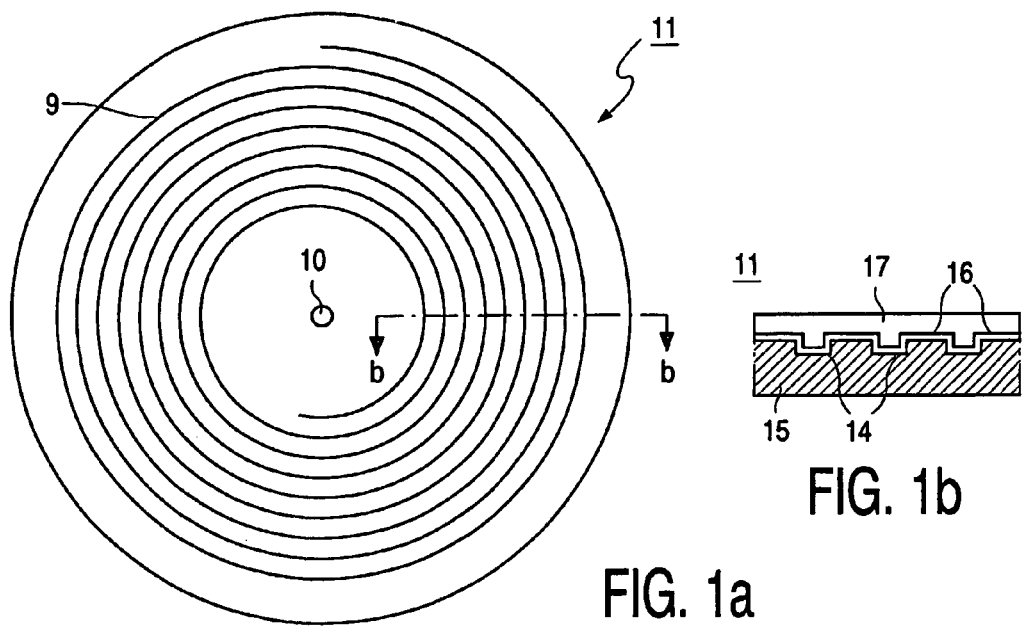
FIG. 1b
FIG. 1a
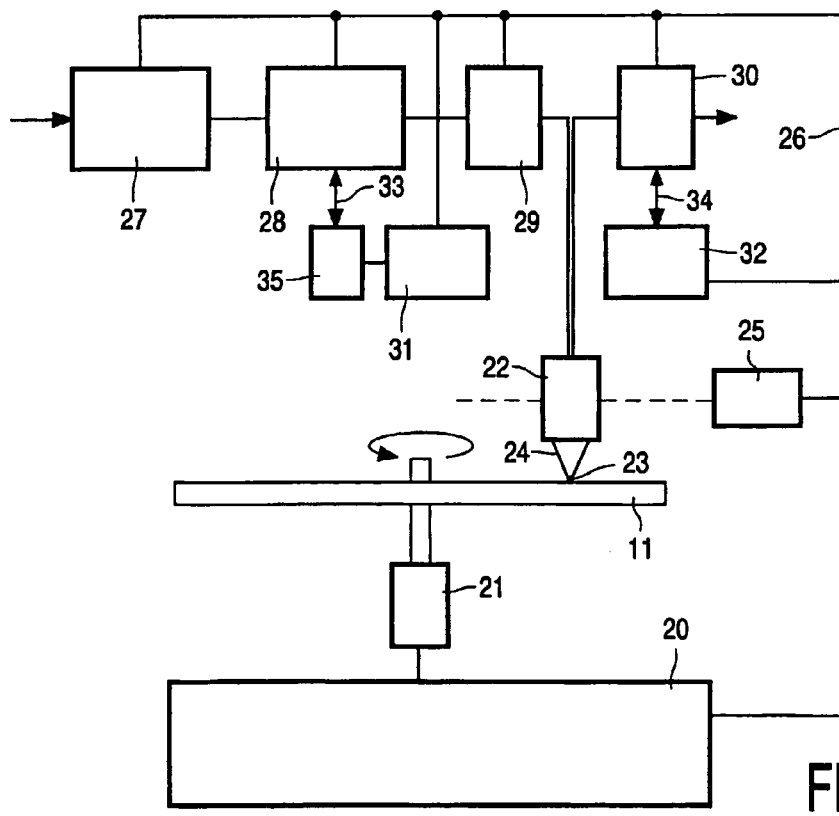
FIG. 2

| extent size [KB] | max. bit rate [kbps] | max. data rate [KB/s] |
|---|---|---|
| 64 | 291.1 | 35.5 |
| 128 | 508.8 | 62.1 |
| 256 | 812.6 | 99.2 |
| 512 | 1158.4 | 141.4 |
| 1024 | 1471.5 | 179.6 |

FIG.3

| Syntax | # bits |
|---|---|
| CD2_main_audio_info() { | |
|     audio_duration | 32 |
|     entry_time | 32 |
|     audio_type | 8 |
|     audio_bit_rate() | 24 |
|     sampling_frequency | 5 |
|     channel_configuration | 3 |
|     bits_per_sample | 2 |
|     emphasis_on | 1 |
|     multiplexed_lyrics_present | 1 |
|     seamless_play_back | 1 |
|     reserved_0 | 3 |
|     n_slideshow_images | 16 |
|     reserved_0 | 16*8 |
| } | |

FIG.4

RECORDING INFORMATION FOR SEAMLESS PLAYBACK

The invention relates to a device for recording information on a record carrier, the record carrier comprising a track for recording information, which information includes real-time information that is to be reproduced continuously via a rendering system having predefined properties at least including a buffer coupled to a read-out unit, a minimal read-out speed $R_{disc}$, of the read-out unit for retrieving information from the track into the buffer, and a maximal seek time $T_{seek}$ for accessing information anywhere on the record carrier, the device comprising a head for scanning the track, and a write unit for recording information in the track via the head.

The invention further relates to a device for reading information from a track on a record carrier, which information includes real-time information that is to be reproduced continuously via a rendering system having predefined properties at least including a buffer coupled to a read-out unit, a minimal read-out speed $R_{disc}$ of the read-out unit for retrieving information from the track into the buffer, and a maximal seek time $T_{seek}$ for accessing information anywhere on the record carrier, the device comprising a head for scanning the track, a read unit for reading information in the track via the head.

The invention further relates to a record carrier comprising a track that carries information, which information includes real-time information that is to be reproduced continuously via a rendering system having predefined properties at least including a buffer coupled to a read-out unit, a minimal read-out speed $R_{disc}$ of the read-out unit for retrieving information from the track into the buffer, and a maximal seek time $T_{seek}$ for accessing information anywhere on the record carrier.

The invention further relates to a method for recording information and a computer program product for performing the method.

A record carrier, and a device and method for recording information are known from U.S. Pat. No. 6,219,311. The device has a head and a write unit for recording information in a track on a record carrier like an optical disc. The information on the record carrier is of a real-time type that is to be continuously reproduced at a data rate R, such as picture data or speech. The information is recorded to be reproduced on a reproduction system having at least some predefined properties, such as a buffer, a minimal read-out speed $R_{disc}$ of the read-out unit for retrieving information from the track into the buffer, and a maximal seek time $T_{seek}$ for accessing information anywhere on the record carrier. The information is divided into minimum continuous recording units, which are used to record the divided information into a space area allocated in the track. A number of data streams N can be recorded simultaneously at least during a reading time Tr. For a single data stream the size S of the minimum recording unit is calculated by $S=[R_{disc}*R*T_{seek}]/(R_{disc}-R)$. Using the minimum size S for the recording units allows a continuous reproduction of real-time information. It is noted that the real time information may include additional information such as a video movie having audio channels and subtitling and control information. The total of information is to be retrieved at rate R for continuous reproduction of the real-time part or parts. The buffer capacity in the reading device is determined to be at least the time that the reading is interrupted multiplied by the data speed R. A problem of the known device and method is that continuous reproduction is guaranteed only for a continuously recorded data stream.

Therefore it is an object of the invention to provide a device and method for recording real-time information for continuous playback that is more flexible for recording information under varying circumstances.

According to a first aspect of the invention the object is achieved with a device for recording information as defined in the opening paragraph, the information being arranged in files, a file having properties at least including a maximal data rate $R_{file}$ of the file for the real-time information in the file to be reproduced continuously, and a maximal size of header information $S_{headers}$ that precedes and/or follows the real-time information in the file, the device having an allocation unit for determining a minimal size of an extent $S_{extent}$ that is a continuous recording unit at least taking into account the properties $R_{disc}$, $T_{seek}$, $R_{file}$ and $S_{headers}$, and recording the information of the files in contiguous parts of the track at least having the size of $S_{extent}$.

According to a second aspect of the invention the object is achieved with a device for reading information as defined in the opening paragraph, the information being arranged in files, a file having properties at least including a maximal data rate $R_{file}$ of the file for the real-time information in the file to be reproduced continuously, a maximal size of header information $S_{headers}$ that precedes and/or follows the real-time information in the file, and being recorded in contiguous parts of the track at least having a size of $S_{extent}$ at least taking into account the properties $R_{disc}$, $T_{seek}$, $R_{file}$ and $S_{headers}$, the device comprising a read-buffer coupled to the head, the read-buffer having at least a size $S_{buffer,min}$ determined taking into account the values of a read-out speed $R_{disc\_}$dev of the read unit for retrieving information from the track into the read-buffer, and a maximal seek time $T_{seek\_}$ dev of the head for accessing information anywhere on the record carrier, and the maximal values of the properties $R_{file}$ and $S_{headers}$ for files to be played: $R_{file,max}$ and $S_{headers,max}$.

According to a third aspect of the invention the object is achieved with a record carrier comprising a track that carries information as defined in the opening paragraph, the information being arranged in files, a file having properties at least including a maximal data rate $R_{file}$ of the file for the real-time information in the file to be reproduced continuously, and a maximal size of header information $S_{headers}$ that precedes and/or follows the real-time information in the file, and the track comprising continuous recording units at least having a size of $S_{extent}$ at least taking into account the properties $R_{disc}$, $T_{seek}$, $R_{file}$ and $S_{headers}$.

The effect of arranging the information in files is that data from different sources and at different moments can be recorded easily on the same record carrier, even allowing different formats for the files. For playing different files the connection between real-time data of the preceding file must be coupled to the real-time information of the succeeding file. While determining the size of the continuous recording unit, usually called extent, the size of the headers (and/or trailers following the real-time data) is taken into account. This results in real-time data from different files to be reproduced seamlessly.

The invention is also based on the following recognition. The known system provides a solution for real-time data recorded as a single unit of considerable playing time, for example a video program. When the user starts watching the program, or switches to a different program, a small waiting time is acceptable. For other data types this is still problematic, in particular for audio tracks following each other. The user will be easily irritated by interruptions of the audio between tracks, even if the interruption is short. The inventors have seen that the headers and/or trailers of files that are used for such recording are causing such interruptions, and have to be taken into account when determining the size of the extents.

In an embodiment of the device the allocation unit comprises an extent unit that contains a number of predefined extent sizes and corresponding maximal data rates available for $R_{file}$. This has the advantage that the predefined extent sizes can be selected to corresponds to an integral number of physical recording units such as ECC blocks or packets. No calculation has to be performed if the corresponding data rates can be easily retrieved from memory, e.g. from a table.

In an embodiment of the device the allocation unit comprises an extent unit for determining said minimal size or a maximal data rate for $R_{file}$ based on: $S_{extent} = ((T_{seek} + S_{headers}/R_{disc}) * R_{file} * R_{disc})/(R_{disc} - R_{file})$. This has the advantage that the actual size of the extent can be selected to be just above the minimum required for the actual file. Hence any spare area of the track can be used of the size is sufficient for the actual needed $S_{extent}$.

In an embodiment of the record carrier the files comprise a flag indicating whether two files are intended to be played seamless, in particular the file containing the flag and the previous one. In an embodiment of the device for reading information the read unit is arranged for reading said flag. Including such a flag in the files and reading it has the advantage that the device can set the reproduction circuitry, timing and buffering to accommodate such a seamless reproduction. Such flag may for example be used in files comprising consecutive songs from the same live concert.

Further preferred embodiments of the device and server entity according to the invention are given in the further claims.

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows a table for selecting an extent size, and FIG. 4 shows header information for an audio file.

In the FIG. elements which correspond to elements already described have the same reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of read-only or a recordable type. An example of a read-only type is a CD, and examples of a recordable disc are the CD-R and CD-RW, and writable versions of DVD, such as DVD+RW, and the high density writable optical disc using blue lasers, called Blu-ray Disc (BD). Further details about the DVD disc can be found in reference: ECMA-267: 120 mm DVD—Read-Only Disc—(1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure comprises position information, e.g. addresses, for indication the location of units of information, usually called information blocks. The position information includes specific synchronizing marks for locating the start of such information blocks.

FIG. 1b is a cross-section taken along the line b—b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. A pregroove 14 enables a read/write head to follow the track during scanning. The pregroove for example constitutes the track structure. The pregroove 14 may be implemented as an indentation or an elevation of the substrate 15 material, or as a material property deviating from its surroundings.

The record carrier 11 may be intended for carrying information in files representing digitally encoded real-time information like LPCM, MP3, or video according to a standardized format like MPEG2.

The information on the disc is recorded in files, and physically in contiguous parts of the track called extents as described below. The files are formed according to predefined standards which define the properties. For the real-time information in the files at least a maximal data rate $R_{file}$ of the file for the real-time information in the file to be reproduced continuously is defined. Further the files have additional control information, usually called headers, which include for the purpose of this document all additional information not included in the (multiplexed) real-time data stream. In particular according to the predefined file format for a specific application the maximal size of the total of header information $S_{headers}$ that precedes and/or follows the real-time information in the file is defined.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read unit 30 of a usual type including a demodulator, deformatter and output unit to retrieve the information. Hence retrieving means for reading information include the drive unit 21, the head 22, the positioning unit 25 and the read unit 30. The device comprises write processing means for processing the input information to generate a write signal to drive the head 22, which means comprise an input unit 27, and modulator means comprising a formatter 28 and a write unit 29. The control unit 20 controls the recording and retrieving of information and may be arranged for receiving commands from a user or from a host computer. The control unit 20 is connected via control lines 26, e.g. a system bus, to said input unit 27, formatter 28 and write unit 29, to the read unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits. The input unit 27 receives the user real-time information and processes the audio and/or video to blocks of information, which are passed to the formatter 28 for adding control data and formatting the data according to the file format of the specific type of data, e.g. MP3 audio data. Real-time data may also be already formatted according to the file format, e.g. from a computer application or a copy of real-time information recorded on a different device, and may be interfaced to the formatter 28 directly. The formatted data from the output of the formatter 28 is passed to the write unit 29, which comprises for example a channel coder, for generating a modulated signal which drives the head 22. Further the write unit 29 comprises synchronizing means for including synchronizing patterns in the modulated signal. The formatted units presented to the input of the modulation unit 29 comprise address information and are written to corresponding addressable locations on the record carrier under the control of control unit 20. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The device has an allocation unit 35 coupled to the control unit 20 via the system bus 26 and coupled to the write unit 29 via formatter 28. The allocation unit 35 allocates contiguous part of the track to record continuous recording units called extents in available space in the track. To guarantee continuous playback in a predefined or standardized reading device the extents have to be of a minimum size as defined below. Thereto the allocation unit 35 is coupled to an extent unit 31 for determining the size of the extents. The extent unit 31 contains the information and rules for determining the extent size for the specific application file. The extent may be calculated according to the formula as described below, or may be selected from a table as shown in FIG. 3.

In particular the extent unit 31 is arranged for taking the size of the headers at the beginning of a file and/or at the end of a file into account.

The device as shown in FIG. 2 further has a read-out function for reproducing data continuously. Thereto the read unit 30 is coupled to a read-out buffer 32 for receiving the data from the head 22 before the data is actually processed for continuous reproduction. The size of the buffer 32 is selected to be dependent on the extent calculation for said standardized reading device. Hence, if the actual reading function has a larger reading speed and/or a smaller seek time than the standardized device, the buffer may be smaller as calculated below. It is noted that a read device without recording function has the same elements as the recording device shown except the input unit 27, formatter 28 and write unit 29, and the allocation unit 35 and the extent unit 31.

For recording real-time information in files the following consideration applies. In the past, the consumer electronic (CE) and personal computer (PC) worlds were completely separate with regard to storage. In the CE world the tape model prevailed, meaning that the unit of data was the complete set of data (e.g. file) stored contiguously. In the PC world the random access model prevailed, meaning that the unit of data was a sector or block. The latter requires a file system relating sets of sectors to a file (complete set of data). The random access model is now entering the CE world, carrying file system technology. Seamless playback is a requirement in the CE world. If the tape model is used it is relatively easy to guarantee seamless playback even if resources are limited. The reason is that unpredictable seeks during playback do not occur. If the random access model is used without additional measures, seamless playback can typically not be guaranteed. Hence an allocation strategy is needed, in particular if different files have to be reproduced seamlessly.

It is proposed to have a rule based player model with limited extent size requirements, providing maximal freedom for drive design. The rule is derived based on the access method and required sustained application data rate necessary for seamless playback of a certain data stream in combination with basic drive parameters. The rules for playback of a single file are described in U.S. Pat. No. 6,219,311 as described in the introduction. Given the application, e.g. compressed audio using a predefined file format, the access method and required sustained application data rate within the file are set. For reproducing consecutive files seamlessly the rule given below establishes which combination of drive parameters satisfies the seamless playback requirement for files including headers. Using the calculation described below different minimum extent sizes are possible for different application data rates and the drive designer can optimise the basic drive parameters to his particular requirements, e.g. bigger drive buffers or higher disc data rate versus lower maximum seek times, all without losing seamless playback guarantees. Advantages are that freedom is offered with regard to the storing, deleting and editing of files while guaranteeing seamless playback even in resource constrained environments. Further the solution is file system independent, any generic file system can be used, and the rule tunes the minimal extent size to the actual bit rate required, thereby minimising the restrictions on allocation. In addition applications are able to determine whether a file is guaranteed to play seamlessly on any compliant device irrespective of its particular design, and the drive designer has more freedom in designing the drive or player. This enables the integrated optimisation with other requirements, e.g. power consumption. In particular the generic rule accommodates for file headers or other file components preceding or following the real-time data in the file that are not multiplexed into the stream. Such header data has to be read before or after the part of the file that contains the multiplexed stream of real-time data. For seamless playback of different files such headers must be included in the rule because the continuous reproduction requires sufficient data in the read-out buffer during reading said headers. The time for reading such headers is equal to the maximal size of the headers divided by the data rate $R_{disc}$ of the disk reproducing system as defined in the standard, and can be added to the seek time in the formula. This addition allows continuous reproduction of consecutive files.

The allocation strategy for recording is based on requirements that enable a reference player to playback all tracks seamlessly in random order. The size of the minimal extent to be recorded continuously is:

$$S_{extent} = ((T_{seek} + S_{headers}/R_{disc}) * R_{file} * R_{disc})/(R_{disc} - R_{file}),$$

wherein $S_{extent}$ is the minimum extent size, $S_{headers}$ is the maximum size of headers at the beginning and/or end of a file $R_{file}$ is the data rate as defined for the file required for reproducing the contents $R_{disc}$ is the maximum rate as defined for reading the disc $T_{seek}$ is the maximum seek time If the minimum extent size is not achieved the track itself is not guaranteed to play seamlessly. For seamless playback within one file the size of the last extent is not relevant. However to guarantee seamless transitions to next tracks, the minimum extent size also applies to the last extent of a file. In an embodiment data trailing the last real-time data in the file is added to the header size $S_{headers}$. This is relevant if the trailer cannot be skipped by the rendering device.

FIG. 3 shows a table for selecting an extent size. For a number of extent sizes in the left column the applicable maximal bit rate in kilobits (kbps) per second is given. In the right column the data rate in KiloByte per second (KB/s) is given, which is calculated using one KiloByte=8.192 bits. The extent sizes are based on a packet writing system that has a minimal packet size such as CD-RW having 64 KB. The packet size is the minimal amount of data that can be written. Only a limited number of sizes are given to accommodate different application types, which has the advantage that the complexity and memory use is limited. Such a table can be incorporated in the memory of the recorder, e.g. in said extent unit 31. The appropriate extent size can then be selected based on the data rate of the file of the application to be recorded.

FIG. 4 shows header information for an audio file. The header information includes a number of parameters as listed below for controlling the process of rendering said file. The corresponding number of bits is given in the right column. The header info shown is called CD2_main_audio_info( ), and is part of a larger amount of header data. The total header size in practical circumstances may be limited to a fixed value to allow standardized authoring systems, e.g. 200 KB. For audio files intended for the CD system a practical limit is 64 KB, which is equal to the size of a packet. The following parameters are defined in the header:

audio_duration—This field contains the total time duration of the CD2 main audio.

entry_time—This field contains the length of a pre-track of the CD2 main audio.

audio_type—This field indicates the type of audio in the CD2 main audio. Note that the CD2 main audio must always be present, so the value of 0 is not allowed for this field. The audio types may for example be:

| Value | Audio type definition |
|-------|-----------------------|
| 0     | No audio present      |
| 1     | AAC encoded audio     |
| 2     | ATRAC3 encoded audio  |
| 3     | LPCM audio (corresponding to the standard CD system) |
| 4     | MP3 audio             |
| 5–255 | Reserved              |

The encoding indicated as AAC, ATRAC3 or MP3 refers to standard audio encoding systems defined in well known standards.

audio_bit_rate—This field indicates the bit rate of the CD2 main audio sampling_frequency—This field indicates the sampling frequency of the CD2 main audio channel_configuration—This field indicates the channel configuration of the CD2 main audio according to predefined configurations, such as stereo or multichannel (discrete or matrixed)

bits_per_sample—This field indicates the bits per sample of the CD2 main audio. This field will contain the value 0×3 (Undefined) in case of non-LPCM audio.

emphasis_on—This field indicates whether emphasis is on (1) or off (0) in the CD2 main audio. Emphasis_on can only have a non-zero value in case of a sampling frequency of 44.1 kHz and LPCM audio.

multiplexed_lyrics_present—A 1-bit flag, which when set to '1' indicates that the main audio contains multiplexed lyrics in one or more text channels. It is noted that lyrics at the beginning or end of the file (hence not multiplexed) have to be included in the size of the headers $S_{headers}$.

seamless_play_back—A 1-bit flag, which when set to '1' indicates that the main audio of this Audio Track File and the previous one are meant for seamless play back. It is noted that this flag indicates whether two files are intended to be played seamless, in particular the file containing the flag and the previous one. This has the effect that the recording device can specifically indicate and the reading device can specifically set the seamless playback mode.

n_slideshow_images—This field contains the number of slideshow images present in the program stream containing the main audio. Note that slideshow images and further additional data added at the beginning or at the end of the file that are not included in the multiplexed stream have to be included in the size of the headers $S_{headers}$.

In an embodiment the effective data rate for the application is lower due to overhead dependent on the type of disc, e.g. packet overhead for a CD-RW. The device is arranged for determining a disc type and determining the $S_{extent}$ taking into account for $R_{disc}$ the overhead in dependence of the disc type.

The relevant properties of the reference player must be predefined, e.g. in a standard, and may be for a CD type player: a maximum data rate of 300 KB/s (N=2), and a maximum seek time of 1.5 s. In particular it is necessary to take the size f the largest headers into account as explained above for the extent. The time needed to read the buffers can be added to the seek time, and sufficient data space has to be present in the buffer to bridge the total time at the maximal speed $R_{file,max}$ of the application to be reproduced. Headers include all data before and after the multiplexed stream of real-time data. It is noted that the minimum buffer size for a player can be calculated as follows:

$$S_{buffer,min} = ((T_{seek} + S_{headers,max}/R_{disc}) * R_{file,max},$$

wherein $S_{headers,max}$ is the largest header size of the files to be played, and $R_{file,max}$ is the highest data rate of the files to be played For example at $S_{headers,max}$=10 kB and $R_{file,max}$=172.27 KB/s a buffer of 266 KB is needed for the reference player, while a more advanced player may exhibit a worst case seek of 1 s and a disc data rate of 600 KB/s in which case a buffer size of 176 KB is sufficient.

Although the invention has been mainly explained by embodiments using optical discs for storing audio, the invention is also suitable for recording video tracks or other real-time information or other disc type record carriers such as magnetic discs or any other rendering device for any type of information. It is noted, that in this document the verb 'comprise' and its conjugations do not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for recording information on a record carrier, the record carrier comprising a track for recording information, said information including real-time information to be reproduced continuously via a rendering system having predefined properties at least including:
   a buffer coupled to a read-out unit,
   a minimal read-out speed Rdisc of the read-out unit for retrieving information from the track into the buffer, and
   a maximal seek time Tseek for accessing information anywhere on the record carrier,
   the device comprising:
   a head for scanning the track;
   a write unit for recording information in the track via the head, the information being arranged in files, a file having properties at least including:
   a maximal data rate Rfile of the file for the real-time information in the file to be reproduced continuously, and
   a maximal size of header information Sheaders that precedes and/or follows the real-time information in the file; and
   an allocation unit for, determining a minimal size of an extent Sextent that is a continuous recording unit at least taking into account the properties Rdisc, Tseek, Rfile and Sheaders, and recording the information of the files in contiguous parts of the track at least having the size of Sextent.

2. The device as claimed in claim 1, wherein the allocation unit comprises an extent unit that contains a number of predefined extent sizes and corresponding maximal data rates available for Rfile.

3. The device as claimed in claim 1, wherein the allocation unit comprises an extent unit for determining said minimal size or a maximal data rate for Rfile based on: Sextent=((Tseek+Sheaders/Rdisc)*Rfile*Rdisc)/(Rdisc−Rfile).

4. The device as claimed in claim 1, wherein the device is arranged for determining a disc type and determining the Sextent taking into account for Rdisc an overhead in dependence of the disc type, in particular a packet overhead for a re-writable disc type.

5. A device for reading information from a track on a record carrier, said information including real-time information to be reproduced continuously via a rendering system having predefined properties at least including:
   a buffer couple to a read-out unit,
   a minimal read-out speed Rdisc of the read-out unit for retrieving information from the track into the buffer, and
   a maximal seek time Tseek for accessing information anywhere on the record carrier,
   the device comprising:
   a head for scanning the track;
   a read unit for reading information in the track via the head, the information being arranged in files, a file having properties at least including
   a maximal data rate Rfile of the file for the real-time information in the file to be reproduced continuously,
   a maximal size of header information Sheaders that precedes and/or follows the real-time information in the file, and
   being recorded in contiguous parts of the track at least having a size of Sextent at least taking into account the properties Rdisc, Tseek, Rfile and Sheaders; and
   a read-buffer coupled to the head, the read-buffer having at least a size Sbuffer,min determined taking into account the values of:
   a read-out speed Rdisc_dev of the read unit for retrieving information from the track into the read-buffer, and
   a maximal seek time Tseek_dev of the head for accessing information anywhere on the record carrier, and
   the maximal values of the properties Rfile and Sheaders for files to be played: Rfile,max and Sheaders,max.

6. The device as claimed in claim 5, wherein the read-buffer has a size based on: Sbuffer,min=((tseek,max+Sheaders,max/Rdisc,max))*Rfile,max.

7. The device as claimed in claim 5, wherein the read unit is arranged for reading a flag from the files indicating whether two files are intended to be played seamless, in particular the file containing the flag and the previous one.

8. A method for recording information on a record carrier, the record carrier comprising a track for recording information, said information including real-time information to be reproduced continuously via a rendering system having predefined properties at least including:
   a buffer coupled to a read-out unit,
   a minimal read-out speed Rdisc of the read-out unit for retrieving information from the track into the buffer, and
   a maximal seek time Tseek for accessing information anywhere on the record carrier,
   and said information being arranged in files, a file having properties at least including:

a maximal data rate Rfile of the file for the real-time information in the file to be reproduced continuously, and a maximal size of header information Sheaders that precedes and/or follows the real-time information in the file, wherein said method comprises the steps of;

determining a minimal size of an extent Sextent that is a continuous recording unit at least taking into account the properties Rdisc, Tseek, Rfile and Sheaders; and recording the information of the files in contiguous parts of the track at least having the size of Sextent.

9. The method as claimed in claim 8, wherein the method comprises a step of:

including a flag in the files indicating whether two files are intended to be played seamless, in particular the file containing the flag and the previous one.

10. The method as claimed in claim 8, wherein the maximal size of header information Sheaders is determined including additional data that precedes and/or follows the real-time information in the file, in particular lyrics information additional to an audio file.

11. A computer readable media having a program thereon for causing a processor to record information, said program being operative to cause a processor to record information on a record carrier, the record carrier comprising a track for recording information, said information including real-time information to be reproduced continuously via a rendering system having predefined properties at least including:

a buffer coupled to a read-out unit, a minimal read-out speed Rdisc of the read-out for retrieving information from the track into the buffer, and maximal seek time Tseek for accession information anywhere on the record carrier;

and said information being arranged in files, a file having properties at lease including:

a maximal data rate Rfile of the file for the real-time information in the file to be reproduced continuously, and a maximal size of header information Sheaders that precedes and/or follows the real-time information in the file, wherein said method comprises the steps of:

determining a minimal size of an extent Sextent that is a continuous recording unit at least taking into account the properties Rdisc, Tseek, Rfile and Sheaders; and recording the information of the files in contiguous parts of the track at least having the size of Sextent.

12. A record carrier comprising a track carrying information, said information including real-time information to be reproduced continuously via a rendering system having predefined properties at least including:

a buffer coupled to a read-out unit, a minimal read-out speed Rdisc of the read-out unit for retrieving information from the track into the buffer, and a maximal seek time Tseek for accessing information anywhere on the record carrier, and said information being arranged in files, a file having properties at least including:

a maximal data rate Rfile of the file for the real-time information in the file to be reproduced continuously, and a maximal size of header information Sheaders that precedes and/or follows the real-time information in the file, wherein the track comprises continuous recording units at least having a size of Sextent at least taking into account the properties Rdisc, Tseek, Rfile and Sheaders.

13. The record carrier as claimed in claim 12, wherein the files comprise a flag indicating whether two files are intended to be played seamless, in particular the file containing the flag and the previous one.

* * * * *